United States Patent [19]

Ikeda et al.

[11] 3,994,841
[45] Nov. 30, 1976

[54] EXPANDABLE STYRENE POLYMER PARTICLE COMPOSITIONS AND A METHOD FOR PREPARING THE SAME

[75] Inventors: Toshiki Ikeda, Shiga; Mutsuhiko Kajimura, Kusatsu; Yoshitsugu Beppu, Shiga, all of Japan

[73] Assignee: Sekisui Kaseihin Kogyo Kabushiki Kaisha, Nara, Japan

[22] Filed: Apr. 21, 1976

[21] Appl. No.: 678,984

[30] Foreign Application Priority Data

Apr. 28, 1975 Japan.............................. 50-51863

[52] U.S. Cl............................ 260/2.5 B; 260/2.5 E; 264/51; 264/53; 526/910; 260/45.85 T; 260/45.85 S
[51] Int. Cl.².......................................... C08J 9/20
[58] Field of Search......... 260/2.5 B, 2.5 E, 2.5 HA; 264/51, 53

[56] References Cited
UNITED STATES PATENTS 3,551,360  12/1970  Pressler.......................... 260/215 FP Primary Examiner—Morton Foelak
Attorney, Agent, or Firm—Armstrong, Nikaido & Wegner

[57] ABSTRACT

Expandable styrene polymer particle compositions containing (1) an expanding agent, which is volatilizable and does not dissolve or may slightly swell the styrene polymer particles, and having a boiling point lower than the softening point of the styrene polymer particles, and (2) a small amount of sulfur containing compound having the following general formula:

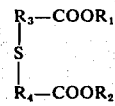

wherein $R_1$ and $R_2$ are the same or different higher alkyl groups having 12 – 18 carbon atoms and $R_3$ and $R_4$ are the same or different lower alkylene groups having 1 – 4 carbon atoms.

8 Claims, No Drawings

EXPANDABLE STYRENE POLYMER PARTICLE COMPOSITIONS AND A METHOD FOR PREPARING THE SAME

BACKGROUND OF THE INVENTION

Expandable styrene polymer particles containing 1 to 20 weight % of a volatilizable expanding agent such as propane, butane, pentane, methyl chloride or dichlorofluoromethane in styrene polymer particles are already known. These expandable styrene polymer particles produce pre-expanded cellular polymer particles by heating them at temperatures above the softening point of the polymer particles. Cellular shaped articles are obtained from the above pre-expanded polymer particles by heating, for example, with steam, at a temperature above the softening point of the polymer particles in a mold and fusing the polymer particles. Therefore, almost all cellular shaped articles are produced by using polymer particles, at the present time.

The distribution of cells in the cellular shaped articles depend upon the cellular structure of the pre-expanded polymer particles. The distribution of cells in the pre-expanded polymer particles have an influence, not only on the quality of the resulting cellular shaped articles, but also on the operation of preparing the cellular shaped articles. Generally, preexpanded polymer particles are heated by steam and fused in a mold to produce articles having the shape of the mold. However, the cellular shaped articles have a tendency to deform, if the articles are removed without cooling to a temperature under the softening point of the polymer particles. In order to remove the cellular shaped articles without changing the shape, it is, generally, necessary to cool for a longer period of time than the heating time. Therefore, the cooling time is a very important factor in the manufacturing cycle of the cellular shaped articles. After molding, cellular shaped articles are cooled in the mold by a suitable cooling medium, for example, by water. Cooling must be continued until the internal portions of the article have cooled to a temperature below the softening point of the polymer. If it is removed from the mold beforehand, deformation may result. Since cellular shaped articles are good insulators, relatively long periods are necessary to cool the moldings. The time period after which the cellular shaped articles may be removed from the mold without any subsequent deformation is usually called the "minimum residence time".

For example, the minimum residence time of cellular shaped articles having fine cells may be shortened in comparison with those having large cells, since the membranes of the cells become thinner as the cells becomes smaller and the remaining expanding agent is released more rapidly. The produced cellular shaped articles having fine cells do not deform, even if the articles are removed from the mold while the articles are hot, since the inner pressure of the articles and post-expanding properties have been minimized. It becomes possible, therefore, to substantially shorten the period for cooling cellular shaped articles and, moreover, to obtain cellular shaped articles having highly desirable properties, as observed on a cut surface, due to the presence of very fine cell sizes.

It is difficult to control the cell size of pre-expanded polymer particles, since the distribution of the cell size is influenced by many factors, such as kind and/or quantity of expanding agent, the degree of polymerization of the polymer, e.g. styrene polymer and other unknown factors.

After investigating a process for obtaining preexpanded polymer particles having fine cells, we have found the following facts.

Pre-expanded styrene polymer particles expanded to a volume of 70 times the original size of the expandable styrene polymer particles, have a cell size in the range of from 0.01 to 0.3 mm in a diameter as observed on a cut surface. Cell sizes of from 0.1 to 0.3 mm are considered to be large cells. Cellular shaped articles having large cells are hard and have good heatresistant properties. However, long cooling periods are required for cooling the cellular shaped articles in the mold. If such cellular shaped articles are removed from the mold before sufficient cooling, the articles further expand, because release of the expanding agent remaining in the cells has been delayed due to the thick membranes of the cell. Moreover, the cut surfaces or shaved faces of the resulting cellular shaped articles are coarse, due to the large cell size.

On the other hand, a cell size of smaller than 0.1 mm in diameter are considered to be fine cells. Cellular shaped articles having fine cells provide the advantage of shorter cooling periods, since the inner pressure of cells drops quickly, and, in turn, provides cut surfaces or shaved faces of the articles having desirable fine properties. However, the surfaces of the pre-expanded particles are glossy and the surfaces of cellular shaped articles made therefrom are partially melted. Therefore, articles of inferior quality are produced.

In order to obtain pre-expanded styrene polymer particles having fine cell size, U.S. Pat. No. 3,565,835 (Heinz Weber et al.) shows the use of ammonium sulfate and U.S. Pat. No. 3,503,905 (Ludwig Zuern et al.) shows the use of a brominated polymer of a 1,3-diene. These compounds are effective to obtain cellular shaped articles having fine cell size, however, they also have some defects. For example, it is difficult to obtain homogeneous fine cell size, since the polymer particles are influenced by storage temperatures of the expandable polymer particles and the heating temperature during the course of the pre-expansion step. Moreover, the obtained cellular shaped articles have a tendency to form an undesirable yellow color upon exposure to sunlight, ultraviolet rays etc. for long period of time, since the above mentioned compounds remaining in the articles are influenced by, for example, ultraviolet rays etc.

SUMMARY OF THE INVENTION

This invention relates to expandable styrene polymer particle compositions and to a method for preparing the same, and, more particularly, to expandable styrene polymer particle compositions containing (1) an expanding agent in an amount of from about 1 to about 20% by weight of said polymer particles, which is volatilizable and does not dissolve or may slightly swell the styrene polymer particles and having a boiling point lower than the softening point of the styrene polymer particles, and (2) a sulfur-containing compound having the following general formula:

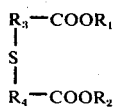

(I)

wherein,
- $R_1$ and $R_2$ are the same or different higher alkyl groups having 12 – 18 carbon atoms, and
- $R_3$ and $R_4$ are the same or different, straight or branched chain lower alkylene groups having 1 – 4 carbon atoms, the sulfur-containing compound being present in an amount of from 0.001 to 0.05 weight % of the styrene polymer particles.

During the investigation for improving the undesirable effects of the above polymer particles, we have found that improvement is achieved by including a small amount of specific compounds in the expandable styrene polymer particles to obtain pre-expanded polymer particles which have been expanded to about 70 times the size of the original particles and having a fine cell size smaller than 0.1 mm, having no glossy surfaces and not having the tendency to discolor upon exposure to ultraviolet rays etc., and, furthermore, having substantially uniform cell size which is not affected by the change of atmospheric temperature.

DETAILED DESCRIPTION OF THE INVENTION

Styrene polymer particles of the present invention include polymer particles prepared by the polymerization of vinyl aromatic monomers including styrene, vinyltoluene, isopropylstyrene, α-methylstyrene, nuclear methylstyrene, chlorostyrene, tert-butylstyrene etc.; styrene copolymer particles prepared by the copolymerization of a styrene monomer with monomers such as 1,3-butadiene, alkyl acrylate (for example, butyl acrylate, ethyl acrylate and 2-ethylhexyl acrylate), alkyl methacrylate (for example, methyl methacrylate, butyl methacrylate and 2-ethylhexyl methacrylate), acrylonitrile, vinyl acetate, α-methylethylene, divinylbenzene, dimethyl maleate and diethyl maleate, wherein the styrene monomer is present in an amount of at least about 50% by weight based on the copolymer.

Styrene polymer particles can, of course, be produced by any of the known techniques, for example, by suspension or mass polymerization, to obtain particles in the form of beads or pellets. Such polymer particles have an average particle diameter size of from 0.2 to 6 mm, preferably from 0.3 to 3 mm.

The expanding agents employed in the present invention include those which do not dissolve the styrene polymer particles, or slightly swell the polymer particles and which have a boiling point lower than the softening point of the polymer particles. The expanding agents include aliphatic hydrocarbons such as propane, butane, isobutane, pentane, neopentane, isopentane, hexane and butadiene, aliphatic cyclic hydrocarbons such as cyclobutane, cyclopentane and cyclohexane and halogenated hydrocarbons such as methyl chloride, methylene chloride, dichlorofluoromethane, chlorotrifluoromethane, dichlorodifluoromethane, chlorodifluoromethane and trichlorofluoromethane. These expanding agents are impregnated into the polymer particles in an amount of from 1% to 20% by weight of the styrene polymer particles.

When propane, butane or mixtures thereof are used as the expanding agent, it is preferred that a small amount of an organic solvent by employed which can dissolve the styrene polymer particles. Such organic solvents include ethylenedichloride, tri-chloroethylene, tetrachloroethylene, benzene, toluene and xylene. These organic solvents are used in amounts of from 0.01 to 3% by weight, preferably from 0.05 to 2% by weight of the polymer particles.

The sulfur-containing compounds employed in the present invention are shown in the above-mentioned general formula (I).

The sulfur-containing compounds include thiodipropionic acid esters and thiodibutyric acid esters such as distearyl thiodipropionate, dilauryl thiodipropionate, di-tridecyl thiodipropionate, lauryl stearyl thiodipropionate, distearyl thiodiisobutyrate, dimyristyl thiodipropionate, dipalmityl thiodipropionate etc. These compounds are used alone or in a combination of two or more compounds.

After various investigations, we have found that the sulfur-containing compounds having the general formula (I) are extremely effective to obtain pre-expanded polymer particles having a fine cell size and are also effective to obtain the cellular shaped articles having a beautiful external appearance.

According to the present invention, the surfaces of the pre-expanded styrene polymer particles are not glossy, although the polymer particles have fine cells. As a result, cellular shaped articles without melted surfaces are produced by the same method for producing articles having large cells.

The sulfur-containing compounds of the general formula (I) are employed in an amount of from 0.001 to 0.05% by weight, preferably from 0.005 to 0.025% by weight of styrene polymer particles. In the case of employing more than the above limited amount of the sulfur-containing compounds of the general formula (I), further improvement is not substantially obtained and excessive amounts tend to deteriorate the quality of the styrene polymer particles. In cases of employing less than the above limited amount of the sulfur-containing compounds of the general formula (I), the desired fine cells are not obtained. Both situations are not desirable.

Styrene polymer particles containing sulfur-containing compounds of the general formula (I) are produced by the following processes:

The sulfur-containing compound of the general formula (I) is added to an aqueous suspension containing styrene polymer particles, with or without the presence of an organic solvent. The resulting mixture is heated to about 70° – 120° C while stirring and styrene polymer particles, having incorporated therein the sulfur-containing compound of the general formula (I), are obtained.

The styrene polymer particles containing the sulfur-containing compound of the general formula (I) are also obtained by adding the sulfur-containing compound during the process of polymerizing styrene. For example, the styrene polymer particles containing the sulfur-containing compound of the general formula (I) are obtained by forming an aqueous suspension medium containing a suspending agent, forming a solution containing the sulfur-containing compound and a polymerization catalyst dissolved in an organic solvent such as benzene, toluene, xylene, ethyl benzene and styrene, adding the above solution to the above aqueous suspension medium, heating the above medium to about 75° – 130° C in the presence of an expanding agent to polymerize the monomer, and cooling the medium to below about 40° C and recovering the resulting expandable styrene polymer particles.

The particles may also be produced by forming an aqueous suspension medium containing a suspending agent, adding a solution of a polymerization catalyst dissolved in styrene monomer to the above suspension medium, heating the suspension medium to a temperature above the decomposition temperature of the catalyst to polymerize the monomer, adding a sulfur-containing compound and an expanding agent to the above medium before completion of the polymerization and proceeding further with the polymerization, cooling the medium to below about 40° C and recovering the resulting expandable styrene polymer particles. In this case, the sulfur-containing compounds should be added in an amount not more than 0.05% by weight of the resulting styrene polymer particles, in order that the sulfur-containing compounds do not act as chain transfer agents or polymerization retarders.

In the process of polymerizing styrene monomers, polymerization catalysts are used. Polymerization catalysts include organic peroxides such as benzoyl peroxide, lauroyl peroxide, t-butyl perbenzoate, t-butyl peroxypivalate, etc, and azo-compounds such as azo-bis-isobutylonitrile, azo-bis-dimethylvaleronitrile etc.

In order to sufficiently suspend the styrene polymer particles in an aqueous medium, suspending agents are used. The suspending agents include slightly water-soluble fine powders such as calcium phosphate, calcium pyrophosphate, magnesium pyrophosphate, sodium pyrophosphate, calcium carbonate, calcium silicate, magnesium chloride, bentonite, calcium hydroxide, magnesium oxide, etc., and water-soluble polymeric compounds such as polyvinylalcohol, methyl cellulose, polyacrylamide etc. These agents are generally used in an amount of from 0.2 to 3% by weight of water. Suspension aids, for example, metal salts of fatty acids such as calcium stearate, zinc stearate, etc., fatty acid bisamides such as ethylene-bis-stearoamide, etc. and surface active agents such as sodium dodecylbenzene-sulfonate etc. may be used together with the above suspending agents. In order to obtain preferred results for the suspension, styrene polymer particles are used in an amount of from about 50 to about 140% by weight of water.

Expandable styrene polymer particles of the present invention produce pre-expanded styrene polymer particles upon heating and have a uniform fine cell size, in comparison with the undesirable pre-expanded styrene polymer particles which do not contain the sulfur containing compounds of the general formula (I). The pre-expanded styrene polymer particles produced by the present invention, therefore, are especially useful for obtaining cellular shaped articles having a beautiful appearance and providing cooling periods substantially shorter than that known in the art in removing them from the mold.

This invention may be applied to methods for producing expandable styrene polymer particles which do not produce preferable cellular shaped articles as large cells are formed, to give preferable properties. This invention may be also applied to methods for producing expandable styrene polymer particles which produce pre-expanded styrene polymer particles having large cells in diameter, to give preferable expandable styrene polymer particles by further treatment.

The following examples are illustrative of the present invention but are not intended to limit the scope thereof.

Example 1

2200g of styrene monomer, 6g of benzoyl peroxide, 1.2g of t-butyl perbenzoate and 0.11g (0.005g weight % based on resulting styrene polymer particles) of the sulfur-containing compound described in the Table 1 were introduced into a 5.6 liter autoclave equipped with a mechanical stirrer. To the above mixture, 2200g of pure water, 9.0g of sodium pyrophosphate 10-hydrate and 0.44g of sodium dodecylbenzene-sulfonate were added. The resulting mixture was heated to 80° C while stirring, and 10g of magnesium chloride 6-hydrate were added. After reacting for 15 hours, while maintaining a temperature of 80° C, the mixture was heated to 100° C, and 66g of propane and 200g of pentane were added. The reaction was continued for an additional 6 hours. Then, the autoclave was cooled to 30° C, and the produced expandable styrene polymer particles were desiccated and dried.

After aging for 1 week at a temperature of 15° C, expandable styrene polymer particles, having a size which passed through a sieve having a size of 10 – 14 mesh ASTM (9 – 12 mesh Tyler, mesh opening 1.41 – 2.00 mm) were expanded by steam to form pre-expanded styrene polymer particles having 70 times the original volume.

After aging for 24 hours, the pre-expanded styrene polymer particles were fed into a mold cavity having a size of 300 × 400 × 100 mm, and heated by steam to produce cellular shaped articles. Minimum residence time, distribution of the cell size and average cell size are shown in the Table 1. Results of expandable styrene polymer particles prepared in the same manner described in Example 1, without using any sulfur-containing compound is shown as comparative data with that of the present invention.

Table 1

| sulfur compound of general formula (I) | minimum residence time (second) | distribution of cell size (mm) | average cell size (mm) |
|---|---|---|---|
| none added | 420 | 0.05 – 0.20 | 0.18 |
| dilauryl thiodipropionate | 350 | 0.04 – 0.12 | 0.09 |
| distearyl thiodipropionate | 330 | 0.04 – 0.10 | 0.07 |
| lauryl stearyl thiodipropionate | 340 | 0.03 – 0.15 | 0.09 |
| distearyl thiodi-isobutyrate | 370 | 0.05 – 0.12 | 0.10 |
| dimyristyl thiodipropionate | 350 | 0.04 – 0.12 | 0.09 |

EXAMPLE 2

The process of Example 1 was substantially repeated, except that the quantity of dilauryl thiodipropionate employed and the time of reaction at 80° C was varied accordingly. The results are shown in Table 2.

Table 2

| added quantity (%) | minimum residence time (second) | distribution of cell size (mm) | average cell size (mm) | reaction time at 80° C (hour) |
| --- | --- | --- | --- | --- |
| 0.05 | 340 | 0.03 – 0.12 | 0.08 | 48 |
| 0.025 | 340 | 0.04 – 0.12 | 0.09 | 22 |
| 0.01 | 350 | 0.04 – 0.12 | 0.09 | 15 |
| 0.001 | 380 | 0.05 – 0.15 | 0.10 | 15 |
| 0.0001 | 400 | 0.05 – 0.15 | 0.15 | 15 |

EXAMPLE 3

2000g of pure water, 800g of styrene polymer particles passing through a sieve having a mesh opening of 1.41 – 1.00 mm, 9g of sodium pyrophosphate 10-hydrate and 0.48g of sodium dodecylbenzenesulfonate were introduced into a 5.6 liter autoclave equipped with a mechanical stirrer. After heating to 85° C, 10g of magnesium chloride 6-hydrate were added to the above mixture. Then, a mixed solution of 0.22g of dilauryl thiodipropionate dissolved in 200g of styrene and 30g of toluene was added. A solution of 1000 g of styrene monomer, 4.8g of benzoyl peroxide and 1.2g of t-butyl perbenzoate was added dropwise and continuously over a period of 3 hours while maintaining a temperature of 85° C. After heating the mixture to 100° C, the reaction was carried out for 6 hours. Then, 80g of propane and 140g of butane were added under pressure, and the reaction was continued for an additional 6 hours to obtain expandable styrene polymer particles. The obtained expandable styrene polymer particles were expanded to produce cellular shaped articles and the minimum residence time during molding was 340 seconds, distribution of cell size was 0.02 – 0.10 mm and the average cell size was 0.08 mm. The external appearances of the obtained cellular shaped articles were very beautiful.

As a comparative example, the procedure of the above Example was substantially repeated except that dilauryl thiodipropionate was omitted. In this case, the minimum residence time was 610 seconds, distribution of cell size was 0.1 – 0.3 mm and the average cell size was 0.22 mm.

EXAMPLE 4

2200g of pure water, 2200g of styrene polymer particles passing through a sieve having a 10 – 14 mesh ASTM (9 – 12 mesh Tyler, mesh opening 1.41 – 2.00 mm), 6g of magnesium pyrophosphate prepared by double decomposition, 0.4g of sodium dodecylbenzenesulfonate and 0.44g of distearyl thiodipropionate were introduced into a 5.6 leter autoclave equipped with a mechanical stirrer. To this mixture, 44g of propane and 176g of pentane were added while stirring, the temperature was raised to 100° C and impregnation was carried out for 5 hours to obtain expandable styrene polymer particles. The obtained expandable styrene polymer particles were expanded to produce cellular shaped articles as described in Example 1 and the minimum residence time during molding was 310 seconds. Distribution of cell size of the pre-expanded polymer particles was 0.05 – 0.15 mm and the average cell size was 0.08 mm. The external appearance of the obtained cellular shaped article was very beautiful.

EXAMPLE 5

2200g of pure water, 2200g of styrene polymer particles passing through a mesh sieve having a 30 – 40 mesh ASTM (28 – 35 mesh Tyler, mesh opening 0.59 – 0.42 mm), 7g of magnesium oxide and 0.22g of dilauryl thiodipropionate were introduced into a 5.6 liter autoclave equipped with a mechanical stirrer. To this mixture, 44g of propane and 176g of pentane were added, the temperature was raised to 110° C, while stirring, and the impregnation was carried out for 1.5 hours. After cooling to 30° C, expandable styrene polymer particles were obtained. The expandable styrene polymer particles were pre-expanded to 12 times volume by heating with steam. After drying and aging, the pre-expanded styrene polymer particles were fed into a mold cavity shaped to produce a cup having a thickness of 2.0 mm, and heated with steam to produce an expanded cellular shaped cup.

The external appearance of the cup was very beautiful and its cell size was uniform and very fine. When the cup was subjected to printing, the print was very clear and fine, therefore, the expandable styrene polymer particle compositions of the present invention provide valuable cellular shaped articles having surfaces which are superior such as for printing.

When the expandable styrene polymer particles were expanded to 70 times the size of the original particles, the distribution of cell size was 0.04 – 0.12 mm, and the average cell size was 0.09 mm.

What is claimed is:

1. Expandable styrene polymer particle compositions comprising styrene polymer particles containing (1) an expanding agent which is volatilizable and does not dissolve or may slightly swell the styrene polymer particles and is present in an amount of from 1 to 20% by weight of the styrene polymer particles and (2) a sulfur-containing compound having the following general formula:

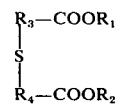

wherein, $R_1$ and $R_2$ are the same or different higher alkyl groups having 12 – 18 carbon atoms and $R_3$ and $R_4$ are the same or different lower alkylene groups having 1 – 4 carbon atoms, the sulfur-containing compound being present in an amount of from 0.001 to 0.05% by weight of the styrene polymer particles, said sulfur containing compound being used for the purpose of obtaining a lower minimum residence time, fine pore size and fast cooling when the composition is molded and foamed.

2. The composition of claim 1, wherein the styrene polymer particles are prepared by the polymerization of aromatic vinyl monomers selected from the group consisting of styrene, vinyltoluene isopropylstyrene, α-methylstyrene, nuclear methylstyrene, chlorostyrene and t-butylstyrene.

3. The composition of claim 1, wherein the styrene polymer particles are copolymer particles prepared by the copolymerization of a styrene monomer with copolymerizable monomers selected from the group consisting of 1,3-butadiene, butyl acrylate, ethyl acrylate, 2-ethylhexyl acrylate, methyl methacrylate, butyl methacrylate, 2-ethylhexyl methacrylate, acrylonitrile, vinyl acetate, α-methylethylene, divinylbenzene, dimethylmaleate and diethyl maleate, the styrene monomer being present in an amount of at least 50% by weight based on the copolymer.

4. The composition of claim 1, wherein the expanding agent is selected from the group consisting of propane, butane, isobutane, pentane, neopentane, isopentane, hexane, butadiene, cyclobutane, cyclopentane, cyclohexane, methyl chloride, dichlorofluoromethane, chlorotrifluoromethane, dichlorodifluoromethane, chlorodifluoromethane and trichlorofluoromethane.

5. The composition of claim 1, wherein the sulfur-containing compound is selected from the group consisting of distearyl thiodipropionate, dilauryl thiodipropionate, di-tridecyl thiodipropionate, lauryl stearyl thiodipropionate and distearyl thiodiisobutylate.

6. A process for preparing expandable styrene polymer particles compositions which comprises
   a. suspending styrene polymer particles in an aqueous suspension medium,
   b. adding to the suspension medium a sulfur-containing compound having the general formula:

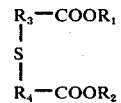

wherein,
   $R_1$ and $R_2$ are the same or different higher alkyl groups having 12 – 18 carbon atoms and
   $R_3$ and $R_4$ are the same or different lower alkylene groups having 1 – 4 carbon atoms, the sulfur containing compound being present in an amount of from 0.001 to 0.05% by weight of the styrene polymer particles, said sulfur containing compound being used for the purpose of obtaining a lower minimum residence time, fine pore size and fast cooling when the composition is molded and foamed,
   c. raising the temperature of the suspension medium while stirring in the presence of an expanding agent to form expandable styrene polymer particles, and
   d. cooling the medium and recovering the resulting expandable styrene polymer particles.

7. A process for preparing expandable styrene polymer particle compositions which comprises
   a. forming an aqueous suspension medium containing a suspending agent and styrene monomer,
   b. forming a solution of a sulfur-containing compound and a polymerization catalyst dissolved in an organic solvent selected from the group consisting of benzene, toluene, xylene, ethyl benzene and styrene, the sulfur-containing compound having the general formula:

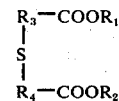

wherein,
   $R_1$ and $R_2$ are the same or different higher alkyl groups having 12 – 18 carbon atoms and
   $R_3$ and $R_4$ are the same or different lower alkylene groups having 1 – 4 carbon atoms, the sulfur containing compound being present in an amount of from 0.001 to 0.05% by weight of the styrene polymer particles, said sulfur containing compound being used for the purpose of obtaining a lower minimum residence time, fine pore size and fast cooling when the composition is molded and foamed,
   c. adding the solution to the aqueous suspension medium,
   d. heating the resulting mixture in the presence of an expanding agent to polymerize the monomer, and
   e. cooling the medium to below about 40° C and recovering the resulting expandable styrene polymer particles.

8. A process for preparing expandable styrene polymer particle compositions which comprises
   a. forming an aqueous suspension medium containing a suspending agent,
   b. adding a solution containing a polymerization catalyst dissolved in styrene monomer to the above suspension medium,
   c. heating the suspension medium to a temperature above the decomposition temperature of the catalyst to polymerize the monomer,
   d. adding a sulfur-containing compound and an expanding agent to the resulting medium before completion of the polymerization and continuing the polymerization, the sulfer-containing compound having the general formula:

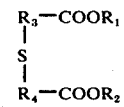

wherein,
   $R_1$ and $R_2$ are the same or different higher alkyl groups having 12 – 18 carbon atoms and
   $R_3$ and $R_4$ are the same or different lower alkylene groups having 1 – 4 carbon atoms, the sulfur containing compound being present in an amount of from 0.001 to 0.05% by weight of the styrene polymer particles, said sulfur containing compound being used for the purpose of obtaining a lower minimum residence time, fine pore size and fast cooling when the composition is molded and foamed, and
   e. cooling the medium and recovering the resulting expandable styrene polymer particles.

* * * * *